(12) United States Patent
Herzberger et al.

(10) Patent No.: US 6,191,540 B1
(45) Date of Patent: Feb. 20, 2001

(54) DEVICES FOR POWERING A MOTOR VEHICLE HEADLIGHT DISCHARGE LAMP

(75) Inventors: Erick Herzberger, Gagny; Jean-Marc Nicolaï, Courbevoie, both of (FR)

(73) Assignee: Valeo Vision, Bobigny (FR)

( * ) Notice: Under 35 U.S.C. 154(b), the term of this patent shall be extended for 0 days.

(21) Appl. No.: 09/402,958

(22) PCT Filed: Feb. 12, 1999

(86) PCT No.: PCT/FR99/00314

§ 371 Date: Oct. 13, 1999

§ 102(e) Date: Oct. 13, 1999

(87) PCT Pub. No.: WO99/41956

PCT Pub. Date: Aug. 19, 1999

(30) Foreign Application Priority Data

Feb. 13, 1998 (FR) .................................................. 98 01475

(51) Int. Cl.$^7$ ...................................................... G05F 1/00
(52) U.S. Cl. ........................ 315/291; 315/209 R; 315/48; 315/245; 315/82
(58) Field of Search ................................ 315/46–48, 63, 315/73, 94, 105, 106, 82, 291, 245, 219, 209 R, 246, 326

(56) References Cited

U.S. PATENT DOCUMENTS

| 4,431,945 | * | 2/1984 | Kawashima et al. | 315/63 |
| 5,198,727 | * | 3/1993 | Allen et al. | 315/291 |
| 5,343,125 | | 8/1994 | Bernitz et al. | 315/245 |
| 5,355,055 | * | 10/1994 | Tary | 315/209 R |

FOREIGN PATENT DOCUMENTS

| 91 11 890 | 1/1991 | (DE) . |
| 0 485 866 | 5/1992 | (EP) . |
| 0 684 755 | 11/1995 | (EP) . |

* cited by examiner

*Primary Examiner*—Haissa Philogene
(74) *Attorney, Agent, or Firm*—Morgan & Finnegan LLP

(57) ABSTRACT

A power supply system for an automobile vehicle headlight discharge lamp, the system including a DC/DC converter with a capacitor at its output, a DC/AC converter powered by the voltage across said capacitor, and a module for generating a high-voltage breakdown pulse designed to be connected in series with said discharge lamp to the output of the DC/AC converter, wherein it further includes a module for heating the electrodes of the discharge lamp design to be connected in series with the discharge lamp and the high-voltage pulse generator module and adapted to deliver, after the high-voltage breakdown pulse, a decreasing voltage which, at the terminals of said discharge lamp, is added to the voltage across the capacitor at the output of the DC/DC converter.

10 Claims, 4 Drawing Sheets

DEVICES FOR POWERING A MOTOR VEHICLE HEADLIGHT DISCHARGE LAMP

BACKGROUND OF THE INVENTION

The present invention relates to power supply systems for automobile vehicle headlight discharge lamps.

It has recently been proposed to use a square-wave alternating current at a frequency in the order of 200 Hz to 1 kHz to power automobile vehicle headlight discharge lamps. Compared with direct current operation, alternating current operation considerably increases the service life of the lamp.

BRIEF SUMMARY OF THE INVENTION

As shown in FIGS. 1 and 2, systems providing a power supply of this type (referred to as "ballast circuits" by the skilled person) generally include a DC/DC converter 1 powered at the battery voltage of the vehicle (12 V) and a DC/AC converter 2 between the discharge lamp 3 of the headlight and a capacitor $C_0$ at the output of the DC/DC converter 1. A module 4 which generates a high-voltage pulse for igniting the lamp 3 is connected in series with the lamp to the output of the DC/AC converter 2.

The DC/AC converter 2 usually comprises four switches 5 configured as an H-bridge and controlled by control electronics (not shown).

The igniting module can comprise a resistor and a capacitor in series with the discharge lamp, for example. A module of this type is described in DE-U-91 11890, for example.

FIG. 3 is a graph showing the supply voltage of the discharge lamp 3 as a function of time during the igniting stage. The graph shows that the voltage at the terminals of the lamp 3 is first raised to a breakdown value (in the order of 12 kV to 25 kV, depending on the lamp). After this igniting pulse, the arc voltage of the lamp 3 falls over a period of a few microseconds from 400 V to less than 120 V (as low as 30 V in some cases).

The igniting stage is then followed by a stage in which the power rises and which precedes the nominal alternating current operating stage (in which the maximum voltages—imposed by the lamp—are in the order of 65 V to 115 V).

During the period of the igniting stage in which the arc voltage falls, the power supply system must supply sufficient power to the lamp 3 to maintain the current in said lamp 3, at the voltages imposed by the lamp 3, as otherwise the arc is extinguished and the lamp 3 must be ignited again.

At present, two techniques are mainly used.

In one of these techniques (FIG. 1), the capacitor $C_0$ and the converter 1 supply power direct to the discharge lamp 3.

However, this requires the converter 1, the capacitor $C_0$ and the H-bridge to be rated to withstand voltages of 500 V and above, which gives rise to problems of overall size in particular.

In the other technique (FIG. 2), a circuit between the H-bridge 2 and the converter 1 with its capacitor $C_0$ includes a second capacitor $C_1$ in series with a short-circuit comprising a resistor R1 shunting a resistor R2 and a diode D2 and which is charged to a voltage higher than the output voltage of the converter 1.

It is this capacitor $C_1$ which powers the discharge lamp 3 throughout the part of the igniting stage in which the lamp voltage falls.

However, that solution requires the addition of bulky components.

Also, the H-bridge must again be rated to withstand voltages of 500 V and above.

The object of the invention is therefore to propose a discharge lamp power supply system that does not have the drawbacks of the aforementioned circuits and which in particular enables the components of the converters on the upstream side of the discharge lamp to be rated to withstand voltages of 200 V and below rather than voltages of 500 V.

To this end, the invention provides a power supply system for an automobile vehicle headlight discharge lamp, the system including a DC/DC converter with a capacitor at its output, a DC/AC converter powered by the voltage across said capacitor, and a module for generating a high-voltage breakdown pulse for connection in series with said discharge lamp to the output of the DC/AC converter, characterised in that it further includes a module for heating the electrodes of the discharge lamp for connection in series with the discharge lamp and the high-voltage pulse generator module and adapted to deliver a voltage which, at the terminals of said discharge lamp, is added to the voltage across the capacitor at the output of the DC/DC converter, and which decreases after the high-voltage breakdown pulse.

A system of the above kind advantageously has the following additional features, individually or in all technically feasible combinations:

- the electrode-heating module includes means for short-circuiting it if the arc voltage of the lamp falls below a given threshold,
- said module includes a capacitor and means for charging said capacitor,
- the capacitor is connected in series with the module for generating a high-voltage pulse,
- the capacitor is connected in parallel with the primary of a transformer whose secondary is connected in series with the module for generating a high-voltage pulse,
- the system includes a switch for short-circuiting the capacitor of the electrode-heating module,
- the system includes a switch controlling discharging of the capacitor of the electrode-heating module into the primary of the transformer of said module,
- the DC/AC converter is an H-bridge including a capacitor half-bridge and a switch half-bridge,
- the electrode-heating module is included in the module for generating a high-voltage pulse.

The invention also includes an automobile vehicle headlight including a reflector, at least one discharge lamp disposed at the back of said reflector and a power supply system for said lamp, characterised in that said system is a power supply system of the aforementioned type.

BRIEF DESCRIPTION OF THE DRAWINGS

Other features and advantages of the invention emerge from the following description. The description is purely illustrative and is not limiting on the invention. It should be read in conjunction with the accompanying drawings, in which:

Referring to FIG. 8, there is illustrated a diagrammatic representation illustration of a headlight 30, a reflector 31, a discharge lamp 32 disposed at the back of reflector 31 and a power supply 40.

DETAILED DESCRIPTION OF THE INVENTION

Figure 1:
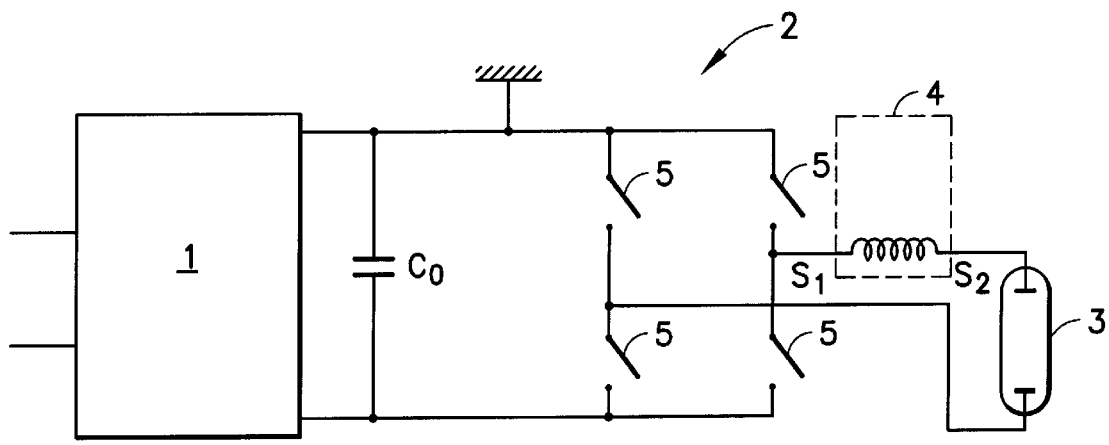
FIGS. 1 and 2, already discussed, show two types of prior art discharge lamp power supply system.
Figure 2:
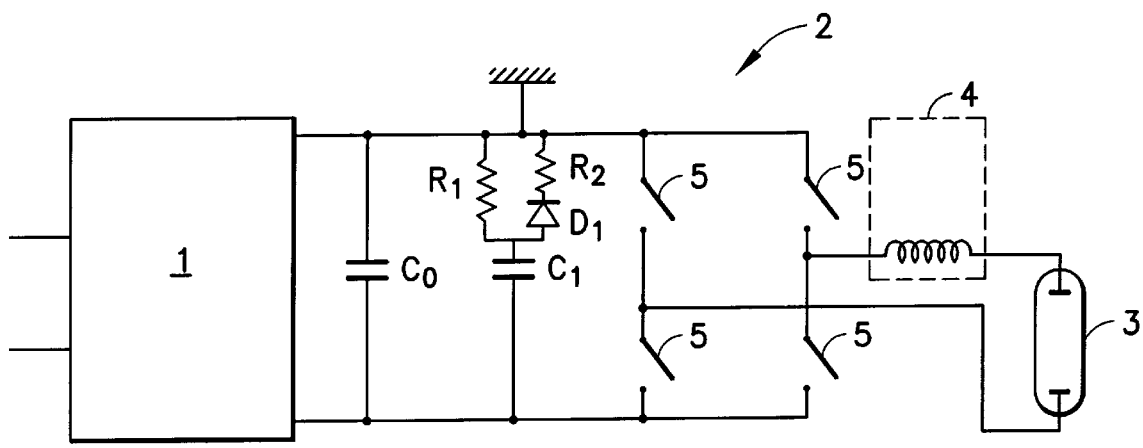
Figure 3:
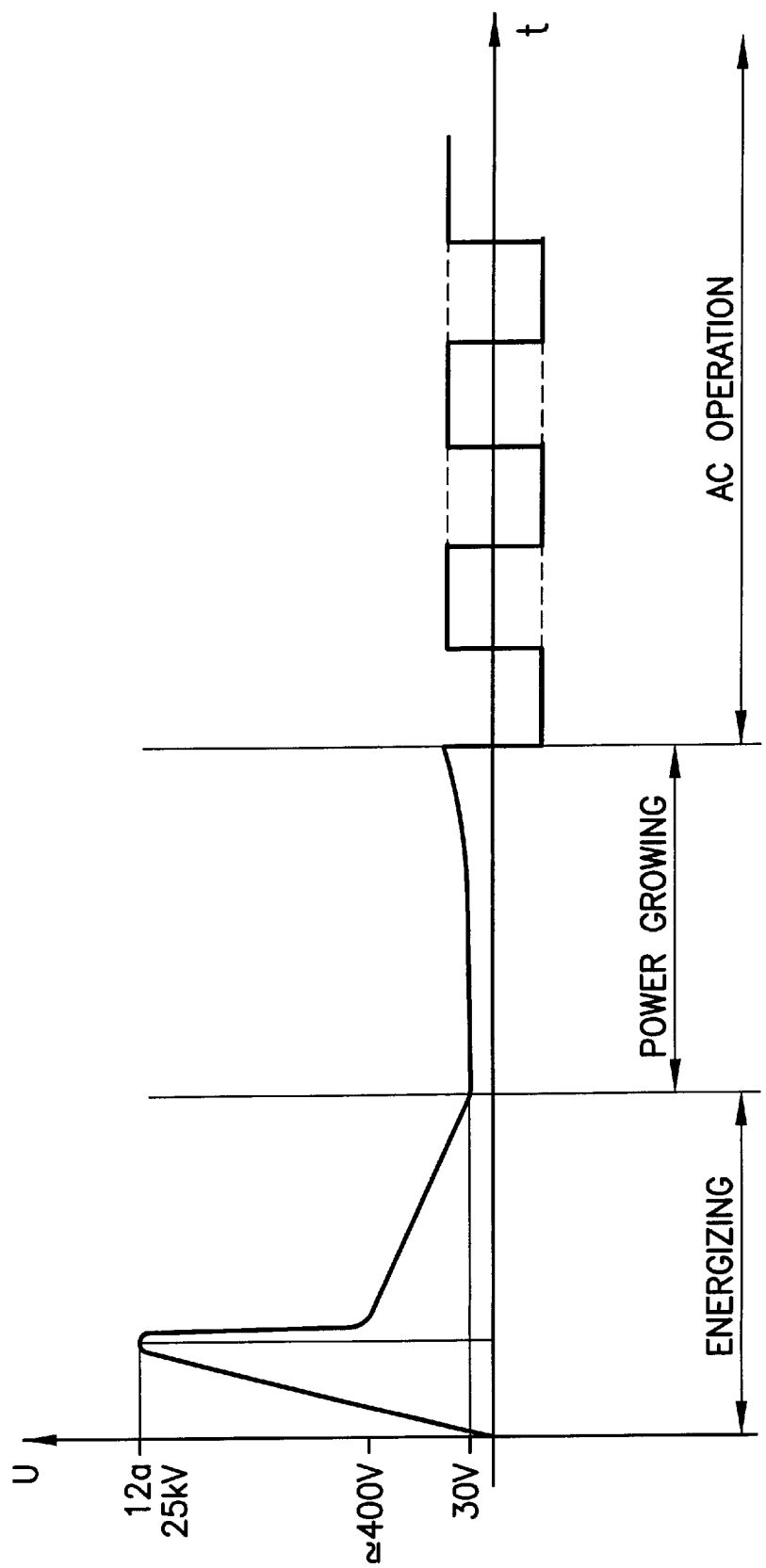
FIG. 3, also already discussed, is a graph showing the supply voltage of an automobile vehicle discharge lamp in operation as a function of time.
Figure 4:
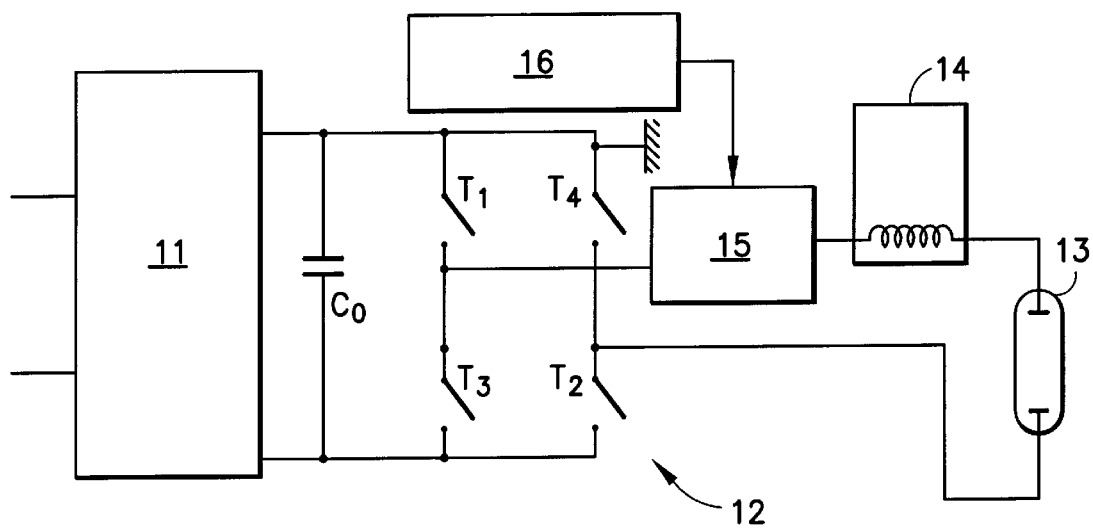
FIG. 4 is a diagrammatic representation, similar to that of FIGS. 1 and 2, of an embodiment of a power supply circuit in accordance with the invention.

The circuit shown in FIG. 4 includes a DC/DC converter 11 powered at the battery voltage, a capacitor $C_0$ connected to the output of the converter 11, a DC/AC converter 12 whose input terminals are connected to the output terminals of the converter 11, and a module 14 for generating a high-voltage pulse connected in series with a discharge lamp 13 to be supplied with power.

For example, the DC/DC converter 11 comprises a transformer whose primary winding is controlled by a switch controlling the power supply to the lamp 13. The DC/AC converter 12 comprises an H-bridge with four switches T1 to T4 (see FIG. 4). The switches T1 and T4 are connected to ground and the switches T3 and T2 are connected to the switches T1 and T4, respectively.

The circuit further includes, in series with the discharge lamp 13 and the module 14, a lamp electrode-heating module 15 which, during the igniting stage following the breakdown pulse, delivers a decreasing voltage which, as seen from the discharge lamp 13, is added to that from the capacitor $C_0$.

To be more precise, during the igniting stage, the switches T1 and T2 are closed and the voltage across the lamp 13 corresponds to the sum of the voltage across the capacitor $C_0$ and the voltage delivered by the module 15. The voltage delivered by the module 15 decreases with that of the discharge lamp, but the capacitor $C_0$ remains charged.

The module 15 advantageously includes means for short-circuiting it if the arc voltage falls below a particular threshold, for example below 120 V.

For example, it includes a switch operated by an external control unit 16 which receives information about the voltage across the lamp 13 from measuring means (not shown) and opens or closes said switch according to the value of that voltage relative to the aforementioned threshold.

Alternatively, the module 15 could behave as a short-circuit itself if the arc voltage of the lamp 13 falls below the aforementioned threshold.

Clearly, with a circuit of the type just described, it is possible to rate the converters 11 and 12 to withstand voltages in the order of 200 V rather than 500 V.

Figure 5:
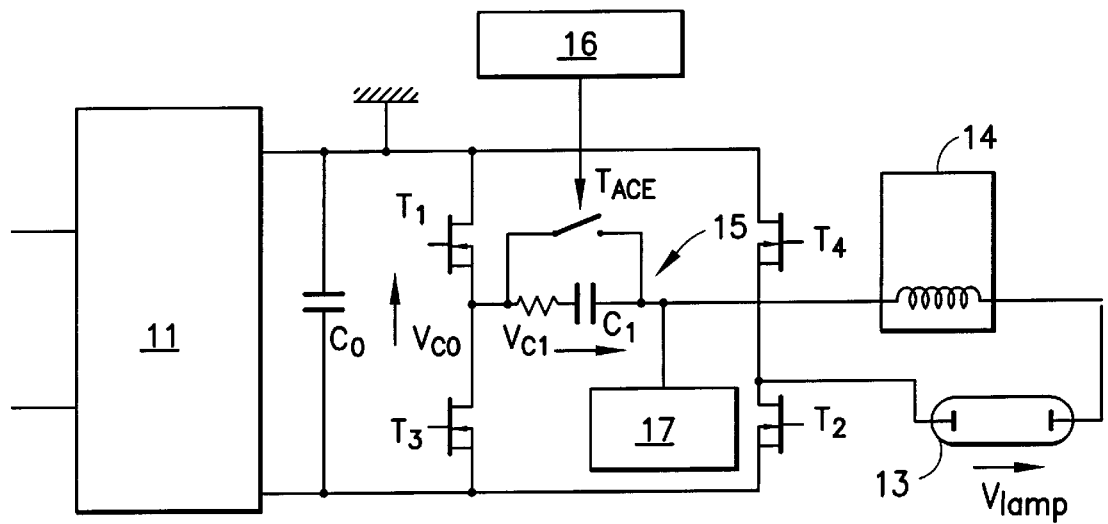
FIG. 5 is a representation similar to that of FIG. 4 showing a possible variant of the FIG. 4 circuit.
Figure 6:
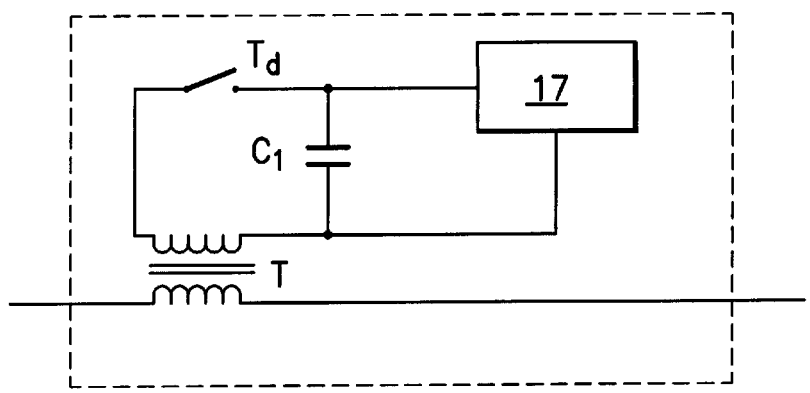
FIG. 6 is a diagrammatic representation of another embodiment of an electrode heater module of the FIG. 4 circuit.

FIGS. 5 and 6 show particular embodiments of the module 15.

The embodiment of the module 15 shown in FIG. 5 includes a resistor R in series with a capacitor $C_1$ and a short-circuit switch $T_{ACE}$.

When the lamp 3 is started, the switches $T_1$ and $T_2$ are on and the switch $T_{ACE}$ is off.

The capacitor $C_0$ at the output of the converter 11 is then charged to a voltage in the range from 100 V to 150 V and an external charging device 17 charges the capacitor $C_1$ to a voltage of more than 200 V. For example, the external charging device 17 comprises an auxiliary secondary winding of the transformer of the converter 11. It could equally well comprise a small transformer whose primary is at the battery voltage.

Following the high-voltage breakdown pulse, the arc is struck and the voltage across the lamp 13 is in the range from 300 V to 350 V or higher ($V_{lamp}=V_{C1}+V_{C0}$) the capacitor $C_1$ is discharged and the DC/DC converter 11 maintains the charge in the capacitor $C_0$.

When the voltage $V_{C1}$ is close to zero (arc voltage below a given threshold), the control unit 16 turns on the switch $T_{ACE}$. This short-circuits the module 15.

The switch $T_{ACE}$ can be a MOSFET or a bipolar transistor. It could equally well be a thyristor.

In the embodiment shown in FIG. 6, the module 15 includes a transformer T whose secondary winding is in series with the discharge lamp 13, the capacitor $C_1$ discharging into the primary of said transformer T. A switch $T_d$ controls discharging of said capacitor $C_1$.

The transformer T is advantageously rated so that the impedance of the secondary winding is low compared with the impedance of the H-bridge.

Embodiments other than those just described are feasible.

In particular, the H-bridge with four switches can be replaced by an H-circuit with a capacitor half-bridge and a switch half-bridge.

Figure 7:
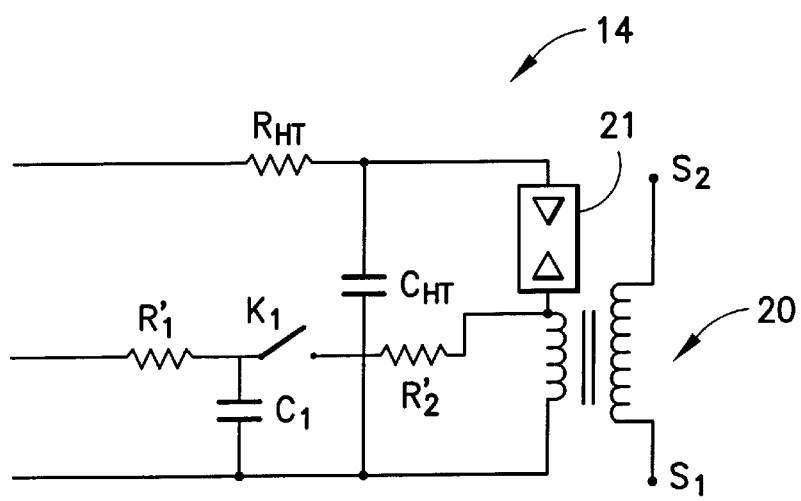
FIG. 7 is a diagrammatic representation of a further embodiment.
Figure 8:
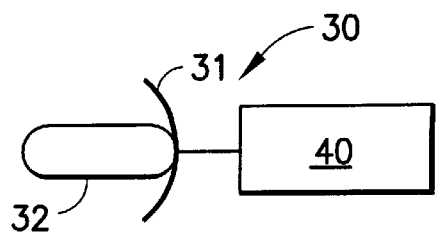
FIG. 8 is a diagrammatic representation of the headlight and power supply in accordance to the subject invention.

Also, as shown in FIG. 7, the electrode-heating module 15 can be incorporated in the module 14 for generating the high-voltage pulse.

The module 14 shown in FIG. 7 includes a transformer 20 whose secondary winding is connected between the discharge lamp 13 (end S2) and the H-bridge 12 (end S1). A high-tension capacitor $C_{HT}$ is connected in parallel with a sub-circuit including the discharge gap 21 in series with the primary winding of the transformer 20. The capacitor $C_{HT}$ is charged to the battery voltage via a resistor $R_{HT}$.

The components $C_{HT}$ and $R_{HT}$ and the transformer 20 are the usual components of a high-voltage pulse generator.

In addition to the above components, the module 14 includes a capacitor $C_1$ which is connected in parallel with a short-circuit comprising the primary winding of the transformer 20, a resistor $R'_2$ and a switch $K_1$. The capacitor $C_1$ is connected to the battery terminals via a resistor $R'_1$.

Following the high-voltage breakdown pulse generated by the capacitor $C_{HT}$, the switch $K_1$ is closed and the capacitor $C_1$ discharges into the primary of the transformer 20, so generating the decreasing voltage which is added to the voltage at the output of the DC/DC converter.

What is claimed is:

1. A power supply system for an automobile vehicle headlight discharge lamp, comprising a DC/DC converter with a first capacitor ($C_o$) at its output, a DC/AC converter powered by a voltage across said capacitor ($C_o$), a high-voltage pulse generator module for generating a high-voltage breakdown pulse connected in series with said discharge lamp to the output of the DC/AC converter, and an electrode-heating module for heating electrodes of the discharge lamp connected in series with the discharge lamp and the high-voltage pulse generator module and adapted to deliver a voltage which, at the terminals of said discharge lamp, is added to the voltage across the capacitor. ($C_o$) at the output of the DC/DC converter, and which decreases after the high-voltage breakdown pulse.

2. A system according to claim 1, wherein the electrode-heating module includes means for short-circuiting the electrode-heating module if an arc voltage of the lamp falls below a given threshold.

3. A system according to claim 1 wherein said module includes a second capacitor and means for charging said second capacitor.

4. A system according to claim 3, wherein the second capacitor ($C_1$) is connected in series with the high-voltage pulse generator module for generating a high-voltage pulse.

5. A system according to claim 3, wherein the second capacitor ($C_1$) is connected in parallel with a primary of a transformer said transformer having a secondary which is connected in series with the high-voltage pulse generator module for generating a high-voltage pulse.

6. A system according to claim 2 which further includes a switch for short-circuiting the second capacitor ($C_1$) of the electrode-heating module.

7. A system according to claim 2 which further includes a switch for controlling discharging of the second capacitor ($C_1$) of the electrode-heating module into the primary of the transformer of said electrode-heating module.

8. A system according to claim 1, wherein the DC/AC converter is an H-bridge including a capacitor half-bridge and a switch half-bridge.

9. A system according to claim 1, wherein the electrode-heating module is included in the high-voltage pulse generator module for generating a high-voltage pulse.

10. An automobile vehicle headlight including a reflector, at least one discharge lamp disposed at the back of said reflector and a power supply system for said lamp wherein said system is a power supply system according to claim 1.

* * * * *